US012438716B2

(12) United States Patent
    Carlisle

(10) Patent No.: US 12,438,716 B2
(45) Date of Patent: Oct. 7, 2025

(54) NON-CUSTODIAL ENROLLMENT AND RECOVERY OF A SECRET

(71) Applicant: LOKBLOK INC., Laguna Beach, CA (US)

(72) Inventor: William Reid Carlisle, St. Petersburg, FL (US)

(73) Assignee: LOKBLOK INC., Laguna Beach, CA (US)

( * ) Notice: Subject to any disclaimer, the term of this patent is extended or adjusted under 35 U.S.C. 154(b) by 0 days.

(21) Appl. No.: 18/326,470

(22) Filed: May 31, 2023

(65) Prior Publication Data

US 2023/0388115 A1     Nov. 30, 2023

Related U.S. Application Data

(60) Provisional application No. 63/347,027, filed on May 31, 2022.

(51) Int. Cl.
    *H04L 9/08*               (2006.01)

(52) U.S. Cl.
    CPC .......... *H04L 9/0894* (2013.01); *H04L 9/0825* (2013.01)

(58) Field of Classification Search
    None
    See application file for complete search history.

(56) References Cited

U.S. PATENT DOCUMENTS

| | | | |
|---|---|---|---|
| 9,430,655 B1* | 8/2016 | Stockton | H04L 9/3236 |
| 2014/0108807 A1* | 4/2014 | Orsini | H04L 63/0428 713/171 |
| 2018/0276661 A1* | 9/2018 | van Wingerden | G06Q 20/383 |
| 2018/0375653 A1* | 12/2018 | Setty | H04L 9/3218 |
| 2021/0126903 A1* | 4/2021 | Racz | H04L 63/061 |
| 2021/0234678 A1* | 7/2021 | Armleder | H04L 9/0897 |
| 2022/0069986 A1* | 3/2022 | Roy | H04L 9/0819 |
| 2022/0150308 A1* | 5/2022 | Hua | H04L 67/14 |

* cited by examiner

*Primary Examiner* — Bassam A Noaman
(74) *Attorney, Agent, or Firm* — Erickson Law Group, PC

(57) ABSTRACT

A method for non-custodial backup of a secret (1021) by the owner of said secret, assisted by a multiplicity n of recovery agents, each having individual public keys and private keys, and the owner having a first value (1013), comprising providing the owner with a first computer program, which at rest will reside on a computer readable medium, configured to enroll the secret by computing a public data set (1023) which does not need to be kept private, requires no security, no secure channels for distribution, and no custody requirements A method for recovery of the secret (1021) is also disclosed, without which there is no way to run the enrollment backwards and recover the secret.

6 Claims, 3 Drawing Sheets

NON-CUSTODIAL ENROLLMENT AND RECOVERY OF A SECRET

This application claims the benefit of and incorporates by reference the text of U.S. Provisional Patent Application No. 63/347,027, filed May 31, 2022, titled "Key Backup and Recovery".

FIELD OF INVENTION

The field of the invention is the backup and recovery of secrets, and more specifically to methods for creating backups of secrets comprising public data and further utilizing third-party recovery agents in backup and recovery of secrets without their having custody of any token of the secret.

BACKGROUND

The National Institute of Standards and Technology ("NIST") Cryptographic Key Management project covers major aspects of managing the cryptographic keys that protect sensitive, unclassified federal information. Natl. Inst. Stand. Technol. Spec. Publ. 800-130, 800-152. The NIST standard sets the baseline not only for protecting federal information, but for important commercial and private information as well.

A cryptographic key is a group of random characters in a particular order. Encryption protocols use a key to alter data so that it's scrambled, and so that anyone without the key can't decode the information. Associated with each key may be specific public information referred to as a Key ID comprising public metadata (e.g., an identifier associated with its owner, its length, and acceptable uses). A password is one example of a key. In general, a cryptographic key is a piece of information that allows control over an encryption or decryption process.

Much interest in secure methods of communication between two distant parties has resulted in creation of the field of public key cryptography, also called asymmetric cryptography. In public key cryptography, each user has a pair of mathematically related cryptographic keys comprising a public key and a private key where the private key is kept secret, while the public key may be widely distributed and used by other users, and in fact may be posted on public key servers such as the MIT PGP Public Key Server A private key, on the other hand, must be kept secret and in a secure location. There are any number of tools available for creating asymmetric key pairs, as will be well known to those of ordinary skill in cryptography.

On the other hand, symmetric cryptography involves the use of symmetric-key algorithms that use the same cryptographic keys for both the encryption of plaintext and the decryption of ciphertext. The keys may be identical, or there may be a simple transformation to go between the two keys. Symmetric-key algorithms may be more resistant to the threat of quantum cryptography merely by doubling key size.

Obviously, a cryptographic key is only useful if it can't be guessed, easily derived, or defeated by brute force, so emphasis has been placed on requiring keys to have high entropy (usually embodied in a minimum character length requirement). Even casual users of smartphones and personal computers are familiar with password requirements such as "at least 8 characters", "one lowercase letter and one uppercase letter", "one number", "one special character", "containing no word in any dictionary", and even more arcane requirements. The use of such keys for computer security requires that the key be copied to a medium that is separate from that used for operational storage and from which the key can be recovered if the original values in operational storage are lost or modified. In practice, however, the "medium" may well turn out to be a Post-It® note on the monitor or a paper taped to the bottom of a drawer.

With equal force, the issue can be generalized to any data that must be kept secret (hence referred to as a "secret" in this disclosure), but is open to loss, modification, or theft because of casual or insecure backup. In the art of blockchain cryptography, for example, as a consequence of Bitcoin Improvement Protocol #39 ("BIP39 Mnemonic code for generating deterministic keys") keys have increased in entropy (e.g., have increased complexity or length), resulting in pass phrases, seed phrases, mnemonic word lists, and the like, acting as keys. As noted above, the threat of quantum cryptography has also led to doubling the size of symmetric keys. This increase in the complexity of keys, however, has made it impossible to memorize a long or complex key and there has been a corresponding increase in lost, forgotten, or inaccurately recorded keys. The New York Times reports that of "the existing 18.5 million Bitcoin, around 20 percent—currently worth around $140 billion—appear to be in lost or otherwise stranded wallets." New York Times, nytimes.com Jan. 21, 2021 "Lost Passwords Lock Millionaires Out of Their Bitcoin Fortunes." A further unintended consequence is that the increase in key complexity has made it all the more likely that the key will be written down on a piece of paper that will be stored in an insecure place (e.g., the bottom of a drawer) or in a file that itself is kept in clear text.

One potential solution, asking friends or institutions to take custody of a backup, has significant problems. The backup could be lost, stolen, or modified, and the custodian might even forget some passphrase that might be needed to gain access to the backup at some future date.

Another potential solution would be to split the backup into shares in such a way that no individual holds any intelligible information about the secret, but when a sufficient number of individuals (referred to as k) combine their 'shares', the secret may be reconstructed. This solution, however, has a significant deficit since the shares are private and must be kept secret (otherwise a bad actor could simply acquire k shares and have access to the backup). Even when wrapped with password based encryption, this "solution" just creates more secrets that need to be backed up. What is needed is a method for backup of keys, metadata, word lists, or other Secrets, in which custody of the Secret is never passed to a third party and the backup itself comprises public data which does not have to be protected, yet is robust enough to allow third parties to assist in recovery of the Secret from the public data backup should it be needed at some future time.

SUMMARY OF THE INVENTION

The invention meets this need by providing a method for backup of keys, metadata, word lists, or other Secrets, in which custody of the Secret is never passed to a third party and the backup itself comprises public data, yet is robust enough to allow third parties to assist in recovery of the Secret from the public data backup should it be needed at some future time.

DETAILED DESCRIPTION OF THE INVENTION

Figure 1:
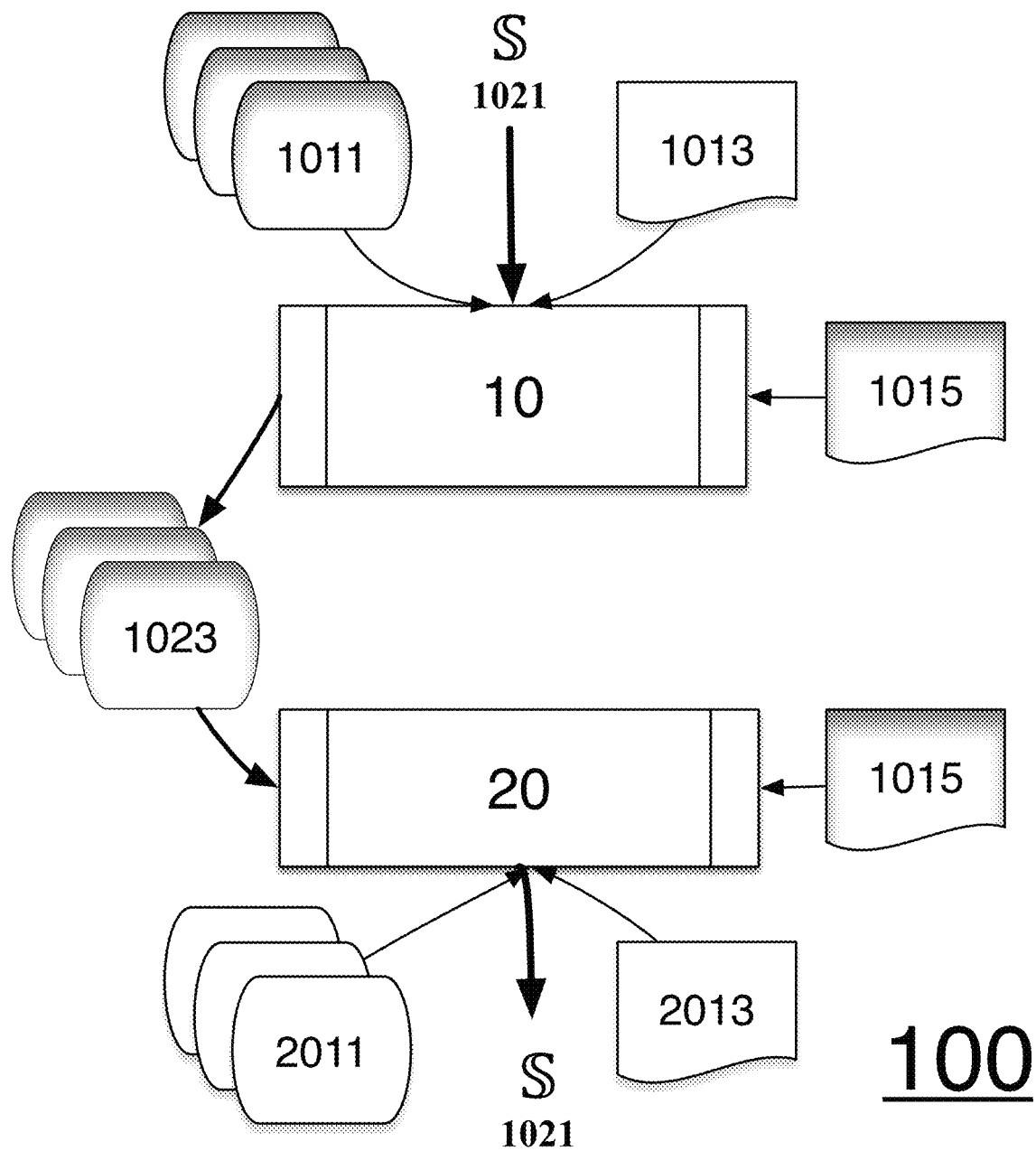
FIG. 1 is a block diagram of the two methods of the invention (100), comprising one method (10) for enrollment of a secret 𝕊 (1021) producing a public backup (1023), and a second method (20) for recovery of an enrolled secret (1021) from the public backup (1023).

With reference to FIG. 1, the invention 100 comprises two distinct methods, the first method 10 is for enrollment of a secret 𝕊 1021 held by an owner (not shown), and output of public data 1023 derived as a function of secret 𝕊 1021, a public nonce 1015, a set of public keys 1011 from a multiplicity n of recovery agents (not shown), and a first value 1013 from the owner of the secret. The second method 20 is for recovery of secret 𝕊 1021 from the public data 1023, derived as a function the public nonce 1015, a set of private keys 2011 from a multiplicity n of recovery agents (not shown), and a second value 2013 from the owner of the secret. At the start of enrollment method 10, the owner of the secret 𝕊 1021, makes a selection of a multiplicity n of recovery agents, and also designates how many recovery agents k of the n selected recovery agents must participate in the recovery of the secret. As explained below, in one embodiment the owner may designate which recovery agents are considered mandatory, and in that case must be part of the k recovery agents needed for the recovery of secret 𝕊 1021.

Enrollment

Figure 2:
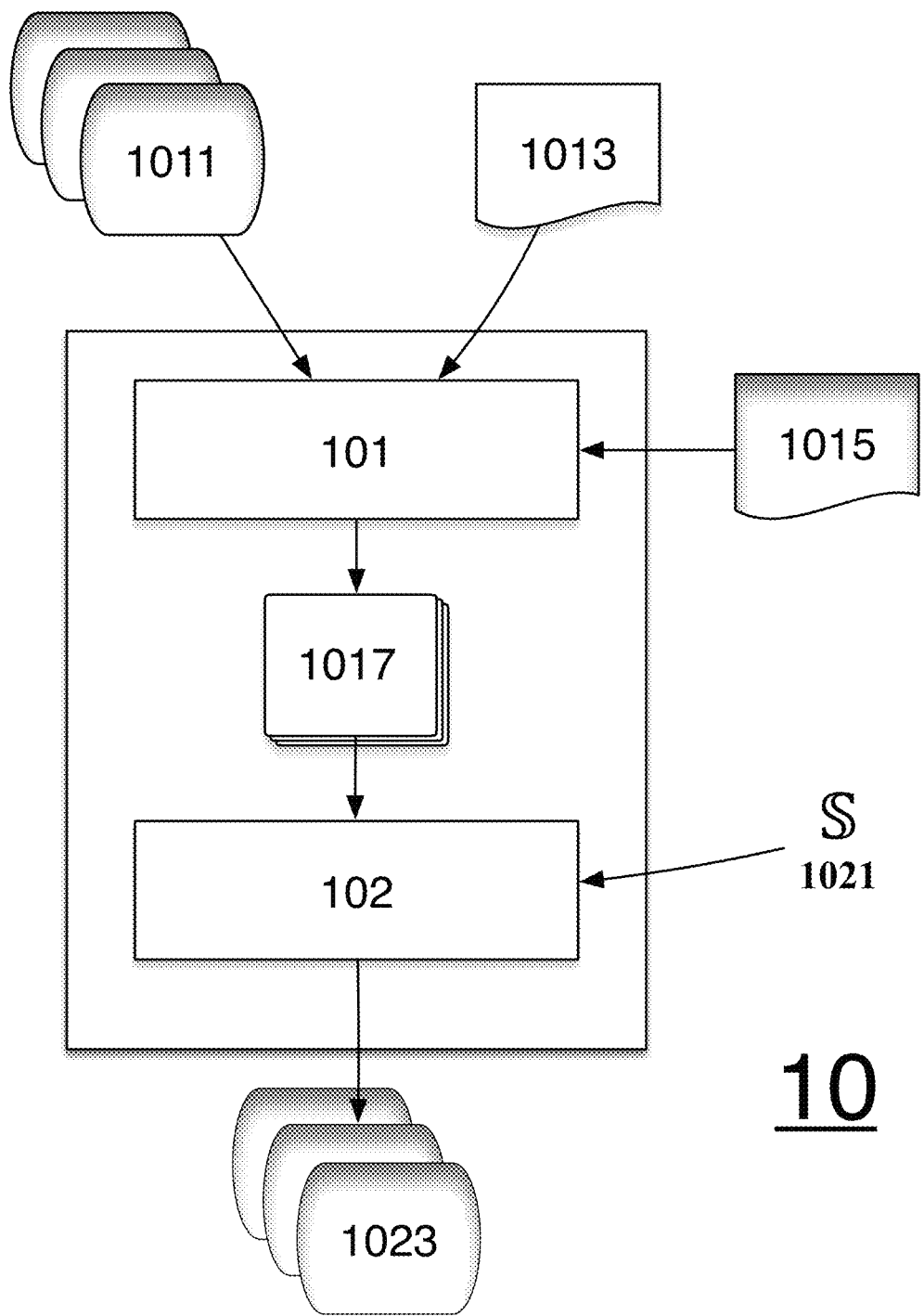
FIG. 2 is a block diagram of the enrollment method (10) of the invention.

With reference to FIG. 2, method 10 of invention 100 enrolls a first secret 1021 which the owner wants to protect. The output of method 10 is a set of public data 1023.

Method 10 is referred to as "enrolling" because the steps of the method enable the derivation of a set of public data 1023, from which secret 𝕊 1021 may be recovered by a subset k of the n recovery agents using method 20.

As will be evident, the steps of method 10 or method 20 can be performed at the owner's computer or possibly even a smartphone or other mobile device or laptop. Because there will be an app or program performing the steps either method, or both, could be operated in a multiplicity of operating systems, and prepared with any number of available programming languages, and stored on an acceptable computer readable medium, or downloaded over the Internet or from an App store. If downloaded through the Internet (an increasingly popular mode of delivery), the program once it is at rest on the owner's device will reside on a computer readable medium. Any person of ordinary skill in the art with reference to this disclosure, now or in the future, will understand how to prepare and distribute computer instructions to perform the steps of the methods described herein.

The recovery agents chosen might be institutional, e.g., businesses offering appropriate services, or individuals who have agreed to undertake responsibility to act as a recovery agent. It might be a device or service; it does not have to be a person. It could even be the original owner using multiple devices they own (e.g., phone, tablet, laptop, desktop, etc.). The only requirement to be a recovery agent as understood in this invention is that such entity or individual or device must have a public-private key pair, which will be well known to those of ordinary skill in the art with reference to this disclosure.

In order to compute the public data 1023 needed to recover the secret 𝕊 1021 the owner of the secret 𝕊 1021 needs to create a first value 1013 and a second value 2013, which are input, respectively, into methods 10 and 20. The first value 1013 and second value 2013 can be an asymmetrical key pair. This is a design choice, which will be influenced by external factors. For example, one preferred embodiment uses a private/public key pair 1013/2013 as the owner's first and second values. In that case the owner's private key should be used as first value 1013, and the owner's public key as second value 2013.

Typically, an entity or individual who has created an asymmetric key pair posts the public key on one of many key servers which are available for lookup by the public. Which key pair the recovery agent chooses to make available for the method of the invention is discretionary, so long as the key pair meets any required bit length parameters and the Recovery Agent undertakes or is designed to maintain the secrecy and integrity of the private key, in a manner consistent with protection of valuable secrets. Of course, for recovery agents the public key $1011_i$ used in enrollment method 10 must be part of a key pair with the private key $2011_i$ used in recovery method 20, and similarly for owners if the first value 1013 used in enrollment method 10 is a private key which is part of an asymmetric key pair then the public key from the pair should be used as the second value 2013 in recovery method 20.

With reference to FIG. 2, in method 10 the owner's first value 1013 is combined with a public key $1011_i$ from each of the n selected recovery agents and a public nonce 1015 in a key derivation 101. The output is then a data set 1017 which is to be used as abscissa values in a secret sharing algorithm 102.

One protocol that could be used as key derivation 101 is Diffie-Hellman, preferably but optionally using elliptic curve cryptography (ECDH). Other key derivation protocols could be used. The key derivation 101 introduces randomness to a process that even given the same two inputs will result in a unique output $1017_i$ depending on the nonce 1015. One of ordinary skill in cryptography will know how to construct a suitable key derivation. Nonce 1015 advantageously can act as a public identifier, or key ID, but should not contain any metadata which the user wishes to be kept private. Key derivation step 101 is repeated for each selected recovery agent, using their respective public keys $1011_i$ and the outputs collected as data set 1017.

However step 101 is configured, the output of the key derivation is a data set 1017 of values, each member of the set corresponding to one of the selected recovery agents. The next step of the method is to employ a secret sharing scheme 102 which will divide the secret 𝕊 1021 into enrolled shares 1023 as a function of the data set 1017. The construction of an appropriate secret sharing scheme 102 useable in the enrollment method 10 and inverse secret sharing scheme 203 useable in the recovery method 20 is set forth in my U.S. Nonprovisional patent application Ser. No. 18/092,294, filed Dec. 31, 2022, now pending, titled "Secure Split Knowledge Multi-Party Secret Generation," the full text of which is incorporated herein by reference.

Any secret sharing scheme could be chosen, but advantageously the Shamir Secret Sharing scheme relies upon creation of an n-order polynomial where degree n is chosen as a function of the desired threshold value k. The scheme exploits the Lagrange interpolation theorem, specifically that k points on a polynomial uniquely determines a polynomial of degree less than or equal to k−1. For instance, 2 points (k=2) are sufficient to define a line (n=1), 3 points are sufficient to define a parabola, 4 points to define a cubic curve, and so forth. Typically, in rectangular coordinate systems, cardinal numbers are used for abscissa (x-coordinate) values, and the ordinate (y-coordinate) values are taken as shares of the secret. Any determinate protocol for producing shares will work in the invention, so long as an inverse protocol is used in the recovery step.

The inputs to secret sharing scheme 102 are the secret $\mathbb{S}$ 1021, the output set of n data values 1017 from the key derivation 101, and the value for k chosen by the owner. Advantageously in a Shamir scheme, set of values 1017 can be used as abscissa x values, k will determine the order of the polynomial, and the ordinate $y_i$ values will then be determined as a function of the abscissa $x_i$ values, the order of the polynomial, and the secret $\mathbb{S}$ 1021, and can be output as the set of public values 1023.

Set 1023 does not need to be kept private because there is no way to run the enrollment backwards and recover the secret 1021 from public set 1023 without the method 20 next described. The set 1023 does not represents shares of the secret 1023, nor even encrypted shares of the secret. Rather, it is a derived public data set that requires no security, no secure channels for distribution, and no custody requirements.

Once the public data set 1023 has been created with method 10 preferably the data set 1017 (which was used as the abscissa values in step 102) and the secret 1021 (which is now recoverable with method 20) should be burned, that is, deleted and wiped from all disks and backups, so that there is no trace of the data, nor any footprints that could carry information from which the secret 1021 could be learned. This increases the security of the backup system herein described, and ensures that recovery method 20 is the only way to recover the secret 1021.

Recovery

With reference to FIG. 1, if user 30 needs to recover secret $\mathbb{S}$ 1021, recovery method 20 can be utilized if the secret has been enrolled according to method 10 (i.e., data set 1023 exists). As described above with respect to the enrollment method 10, the steps of the recovery method 20 can be performed at an owner's computer or possibly even a smartphone or other mobile device or laptop. The app or program performing the recovery could be operated in a multiplicity of operating systems, and prepared with any number of available programming languages, and stored on an acceptable computer readable medium, or downloaded over the Internet or from an App store. Any person of ordinary skill in the art with reference to this disclosure will understand how to prepare and distribute computer instructions to perform the steps of the recovery method described herein. A single app could be provided that would handle both enrollment and recovery, or optionally, separate apps restricted to either enrollment or recovery could be constructed.

To begin recovery the necessary recovery agents need to be contacted. The number of recovery agents needed for a successful recovery will depend upon the value of k chosen at enrollment. For example, if five recovery agents were chosen, with a threshold k=3, then any three recovery agents will be sufficient to perform the recovery (in such example it is assumed that each recovery agent has been dealt one share).

Optionally, there could be a hierarchy among the recovery agents. One way to accomplish this would be with strategic dealing of the shares. For example, in a 3 of 6 arrangement three shares could be dealt to the user, and one share to each of three entity recovery agents. That would permit the user to enable recovery without using any third-party agents, or, if the owner was not available, the three entity recovery agents could act. An additional, but optional, variation on hierarchy would be to designate specific shares as required, or mandatory, and others as optional. Then, in the example of a 3 of 6 scheme where one share has been designated as mandatory, only three recovery agents are needed, but one of the three participants must be the mandatory agent. There are many ways to construct this requirement in an app as will be evident to one of ordinary skill.

Figure 3:
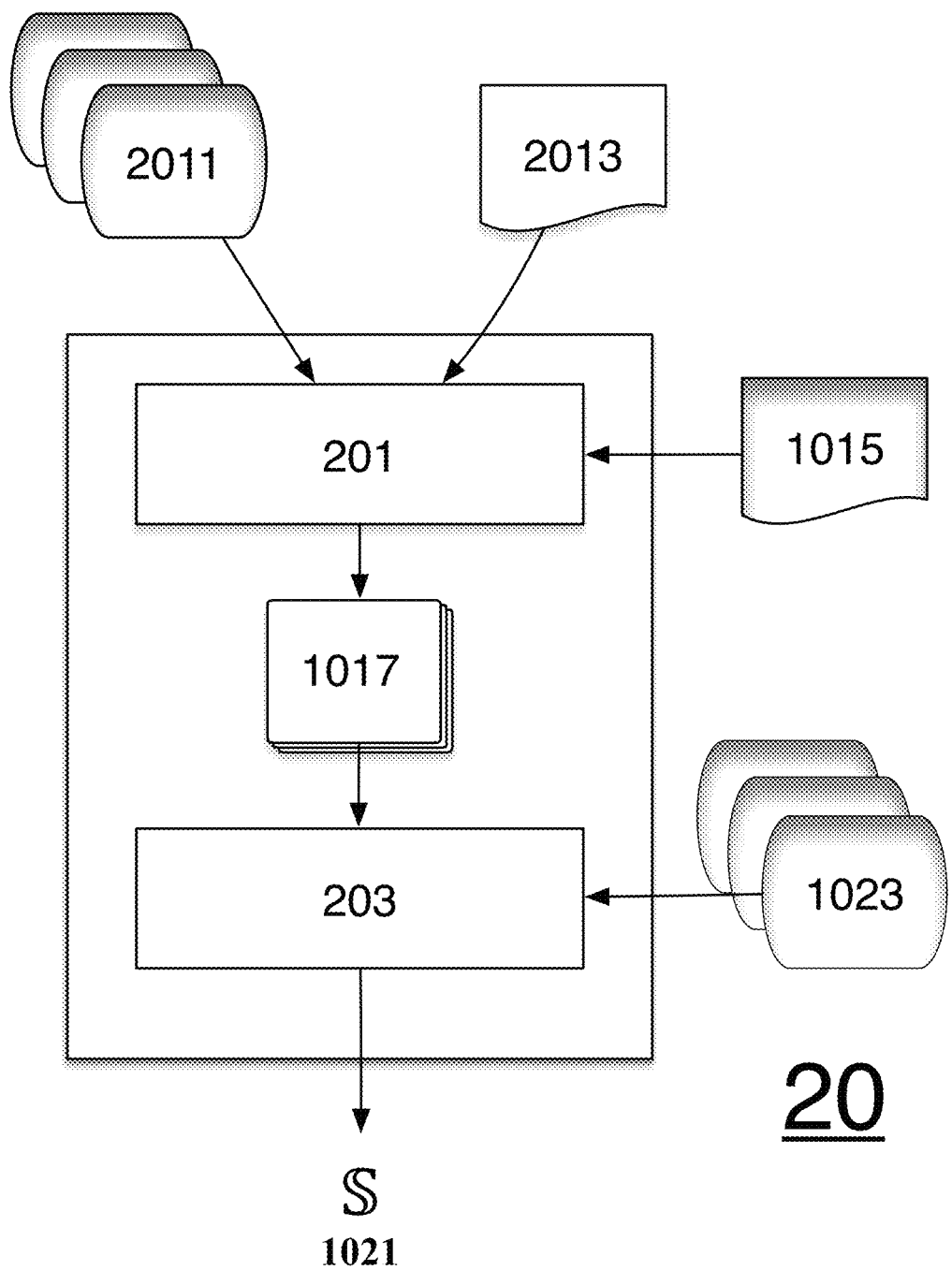
FIG. 3 is a block diagram of the recovery method (20) of the invention.

With reference to FIG. 3, the private keys 2011 of k recovery agents are input to the key derivation algorithm at step 201, together with the second value 2013 of the owner, and the nonce 1015 used in the enrollment step as the Key ID. Appropriate security should preferably be given to the means and channels of transport of the private keys 2011. Key derivation step 201 then computes the data set 1017 which is the same data set 1017 that was computed in the key derivation step 101 in enrollment method 10, and which was preferably burned. In this manner the intermediate abscissa values for the polynomial which contains the embedded secret have been obtained.

Key derivation step 201 in recovery method 20 is similar to the key derivation step 101 in the enrollment method as the output in both cases is the set of $x_i$ values 1017. The difference is that in enrollment, in one embodiment, the owner's first value 1013 is a private key of a key pair and the public keys 1011 for all n recovery agents are input, while in recovery method 20 the owner's second value 2013 is the public key of the key pair and the private keys 2011 for only k of n recovery agents need be input. Now it can be observed why it is important to burn data set 1017: a burned data set 1017 cannot be learned without access to k recovery agents' private keys 2011 and the owner's second value 2013.

The data set 1017 (representing the abscissa values for the polynomial) are then input into a reverse secret sharing algorithm 203, which is the inverse of the algorithm 102 used in the enrollment method 10. The public data set 1023 (being the ordinate values of the polynomial) are then input into the reverse secret sharing algorithm 203, and the secret 1021 may then be computed and output.

Those skilled in the art will appreciate that the described embodiments are exemplary rather than limiting the present invention. Substitute embodiments may be designed by those skilled in the art without departing from the scope of the claims.

The invention claimed is:

1. A method for non-custodial enrollment of a secret comprising:
   (a) obtaining a multiplicity of public keys corresponding to a multiplicity of recovery agents where each public key of the multiplicity of public keys is associated with a corresponding private key and a corresponding recovery agent of the multiplicity of recovery agents,
   (b) computing an abscissa data set as a function of (i) a public nonce, (ii) an enrollment private key, and (iii) the multiplicity of public keys, wherein the function is repeated for each recovery agent, using the recovery agent's respective public key, where outputs of the function are collected as the abscissa data set, (c) enrolling the secret by computing a public data set as a secret sharing function of (i) the abscissa data set, (ii) the secret and (iii) a predefined recovery agent quantity, and thereafter (d) burning the abscissa data set.

2. The method of claim 1, wherein the predefined recovery agent quantity is predefined by an owner of the secret.

3. The method of claim 1, comprising burning the secret after enrolling the secret.

4. A method for recovery of a secret enrolled in a non-custodial enrollment method and recovered from a public data set, comprising:

(a) computing an abscissa data set as a function of (i) a public nonce used in the enrollment of the secret, (ii) a public key that corresponds to an enrollment private key, and (iii) a multiplicity of private keys, wherein each private key corresponds to a public key associated with a corresponding recovery agent of a multiplicity of recovery agents, and wherein the function is repeated for each recovery agent, using the recovery agent's respective private key, where outputs of the function are collected as the abscissa data set, wherein the multiplicity of recovery agents is a predefined recovery agent quantity of recovery agents and the predefined recovery agent quantity was used in the enrollment of the secret, and, (b) computing and recovering the secret, as a reverse secret sharing function of (i) the abscissa data set, and (ii) the public data set.

5. A method for non-custodial enrollment of a secret and recovery of the secret, comprising:

(a) obtaining a multiplicity of public keys corresponding to a multiplicity of recovery agents where each public key of the multiplicity of public keys is associated with a corresponding private key and a corresponding recovery agent of the multiplicity of recovery agents;

(b) computing an abscissa data set as a function of (i) a public nonce, (ii) an enrollment private key, and (iii) the multiplicity of public keys, wherein the function is repeated for each recovery agent, using the recovery agent's respective public key, where outputs of the function are collected as the abscissa data set;

(c) enrolling the secret by computing a public data set as a secret sharing function of (i) the abscissa data set, (ii) the secret and (iii) a predefined recovery agent quantity, and thereafter (d) burning the abscissa data set;

(e) computing the abscissa data set as a function of (i) the public nonce, (ii) a public key that corresponds to the enrollment private key, and (iii) a multiplicity k of the private keys, where each private key of the multiplicity k of the private public keys is associated with a corresponding recovery agent of a multiplicity k of the recovery agents, and wherein the function is repeated for each recovery agent of the multiplicity k of the recovery agents, using the recovery agent's respective private key, where outputs of the function are collected as the abscissa data set, wherein the multiplicity k of the recovery agents is the predefined recovery agent quantity of the recovery agents; and, (f) computing and recovering the secret, as a reverse secret sharing function of (i) the abscissa data set, and (ii) the public data set.

6. The method of claim 5, comprising burning the secret after enrolling the secret and before (e) computing the abscissa data.

* * * * *